United States Patent
Matsumoto

(10) Patent No.: US 6,902,322 B2
(45) Date of Patent: Jun. 7, 2005

(54) LINEAR GUIDE BEARING APPARATUS

(75) Inventor: Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 27 days.

(21) Appl. No.: 10/413,486

(22) Filed: Apr. 15, 2003

(65) Prior Publication Data

US 2003/0215166 A1 Nov. 20, 2003

(30) Foreign Application Priority Data

Apr. 19, 2002 (JP) .................................. P. 2002-118053

(51) Int. Cl.⁷ .............................................. F16C 29/06
(52) U.S. Cl. ......................................... 384/15; 384/45
(58) Field of Search ............................... 384/15, 44, 45

(56) References Cited

U.S. PATENT DOCUMENTS

| | | | |
|---|---|---|---|
| 5,358,336 A | | 10/1994 | Agari |
| 5,429,439 A | | 7/1995 | Hsu et al. |
| 5,947,605 A | * | 9/1999 | Shirai ........................... 384/45 |
| 6,030,124 A | | 2/2000 | Moseberg et al. |
| 6,042,268 A | * | 3/2000 | Shirai ........................... 384/44 |
| 6,113,272 A | | 9/2000 | Michioka et al. |
| 6,170,986 B1 | | 1/2001 | Hsu et al. |
| 6,200,031 B1 | * | 3/2001 | Faulhaber et al. ............. 384/45 |
| 6,217,217 B1 | * | 4/2001 | Teramachi ..................... 384/44 |

FOREIGN PATENT DOCUMENTS

DE    19841668 A1    3/2000

* cited by examiner

*Primary Examiner*—Thomas R. Hannon
(74) *Attorney, Agent, or Firm*—Sughrue Mion, PLLC

(57) ABSTRACT

A linear guide bearing apparatus has a guide rail including a first raceway groove; a movable element including a second raceway groove and a rolling element return groove connected continuously with the second raceway groove through curved grooves respectively formed in the two end portions of the second raceway groove, the movable element being movably fitted with the guide rail; a plurality of rolling elements loaded in a circulation passage including the first raceway groove, the second raceway groove, the curved grooves, and the rolling element return groove for moving the movable element along the guide rail; and, an under-seal disposed in the movable element for sealing a space between the guide rail and the movable element, wherein the under-seal includes a sliding contact portion elastically contacted with the guide rail to thereby receive an upward-going force from the guide rail.

15 Claims, 4 Drawing Sheets

LINEAR GUIDE BEARING APPARATUS

BACKGROUND OF THE INVENTION

1. Field of the Invention

The present invention relates to a linear guide bearing apparatus which is used as a linear guide in a machine tool and industrial machines.

2. Description of the Related Art

As a linear guide bearing apparatus which is used as a linear guide in a machine tool and industrial machines, there is conventionally known a guide bearing apparatus which includes a guide rail, a slider serving as a movable element, and a plurality of balls serving as rolling elements.

In the conventional guide bearing apparatus, the guide rail extending in the axial direction of the apparatus includes two first raceway grooves respectively formed in the two side walls thereof. The slider includes not only two second raceway grooves disposed opposed to the first raceway grooves of the guide rail but also ball return grooves respectively connected continuously with the second raceway grooves through their associated curved grooves respectively formed in the two end portions of each of the second raceway grooves. The slider includes a slider main body and a pair of end caps respectively to be connected to the two end portions of the slider main body; and, the second raceway grooves and ball return grooves are respectively formed in the slider main body, while the curved grooves are respectively formed in the end caps. This slider can be disposed by fitting the guide rail with the slider from the upward direction thereof in such a manner that the slider can be moved freely. The plurality of balls are used to move the slider along the guide rail, while the balls are disposed in a circulation passage which is composed of the first raceway grooves, second raceway grooves, curved grooves and ball return grooves.

In the linear guide bearing apparatus, in order to prevent dust from entering the circulation passage, there are disposed long-and-narrow-plate-shaped under-seals for sealing the two side walls of the guide rail and the two inner walls of the movable element. These under-seals are mounted on the lower wall of the slider along the axial direction of the guide bearing apparatus.

As a mounting structure for mounting the under-seals, there is conventionally known a mounting structure in which under-seal support grooves are formed in the end caps and the two end portions of the under-seals are respectively inserted into the under-seal support grooves.

However, in the above conventional mounting structure, in case where the two end portions of the under-seals are respectively inserted into the under-seal support grooves to thereby support the under-seals, the long-and-narrow-plate-shaped under-seals receive downward-going forces due to their own weights and the longitudinal-direction middle portions thereof are thereby flexed, which raises a fear that a poor sealing condition can occur.

SUMMARY OF THE INVENTION

The present invention aims at eliminating the drawbacks found in the above-mentioned conventional linear guide bearing apparatus. Accordingly, it is an object of the invention to provide a linear guide bearing apparatus which can reduce the flexion of the under-seals due to their own weights.

In attaining the above object, according to the invention according to a first aspect, there is provided a linear guide bearing apparatus having a guide rail including a first raceway groove and extending in an axial direction of the linear guide bearing apparatus a movable element including a second raceway groove opposed to the first raceway groove and a rolling element return groove connected continuously with the second raceway groove through curved grooves respectively formed in the two end portions of the second raceway groove, the movable element being movably fitted with the guide rail, a plurality of rolling elements loaded in a circulation passage including the first raceway groove, the second raceway groove, the curved grooves, and the rolling element return groove for moving the movable element along the guide rail and, an under-seal disposed in the movable element for sealing a space between the guide rail and the movable element, wherein the under-seal includes a sliding contact portion elastically contacted with the guide rail to thereby receive an upward-going force from the guide rail.

According to the present linear guide bearing apparatus, since the under-seal includes a sliding contact portion which can be elastically contacted with the guide rail to thereby receive an upward-going force from the guide rail, the downward-going flexion of the guide rail due to its own weight can be restricted due to the upward-going force given to the guide rail by the sliding contact portion of the under-seal.

Preferably, as in the invention according to a second aspect, in the guide rail, a groove portion may be formed in the guide rail, the sliding contact portion being contacted with the groove portion.

Also, as in the invention according to a third aspect, two end portions of the under-seal in the longitudinal-direction thereof may be supported on the movable element. In this case, as in the invention according to a fourth aspect, at least one portion of a middle portion of the under-seal in the longitudinal-direction thereof may be supported on the movable element.

Further, as in the invention according to a fifth aspect, preferably, the under-seal may be formed of a single material.

Still further, as in the invention according to a sixth aspect, preferably, the under-seal may be formed of a single material obtained from a molding with the section shape being uniform in the longitudinal direction thereof. In this case, a previously manufactured molding can be cut to a required length when it is used.

Moreover, as in the invention according to a seventh aspect, the under-seal may include a lip which extends in the same direction as the sliding contact portion and may be slidingly contacted with the guide rail.

DETAILED DESCRIPTION OF THE PREFERRED EMBODIMENTS

Figure 1:
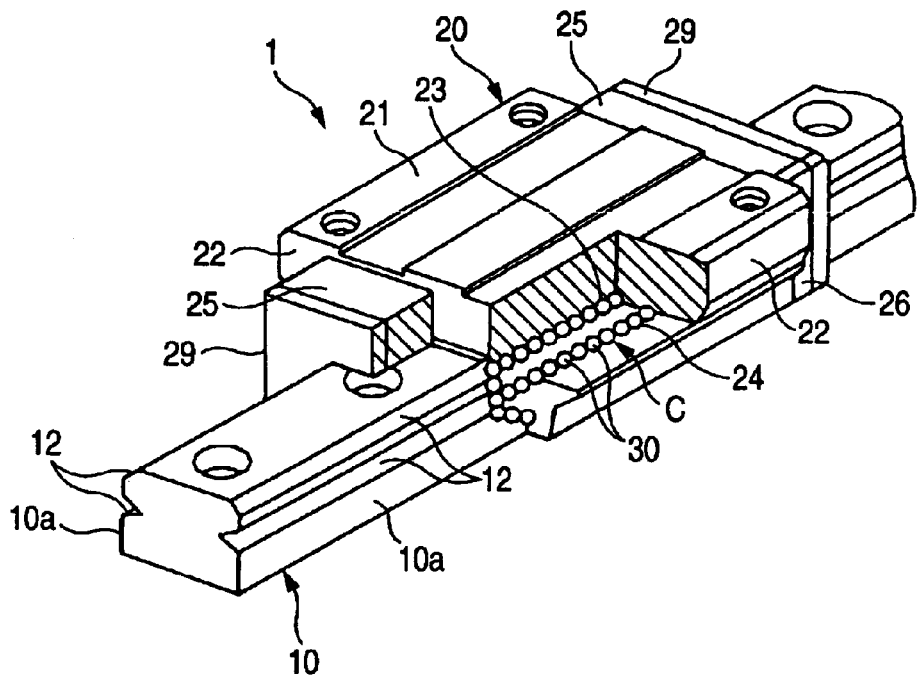
FIG. 1 is a partially cut-away perspective view of a linear guide bearing apparatus according to a first embodiment of the invention.
Figure 2:
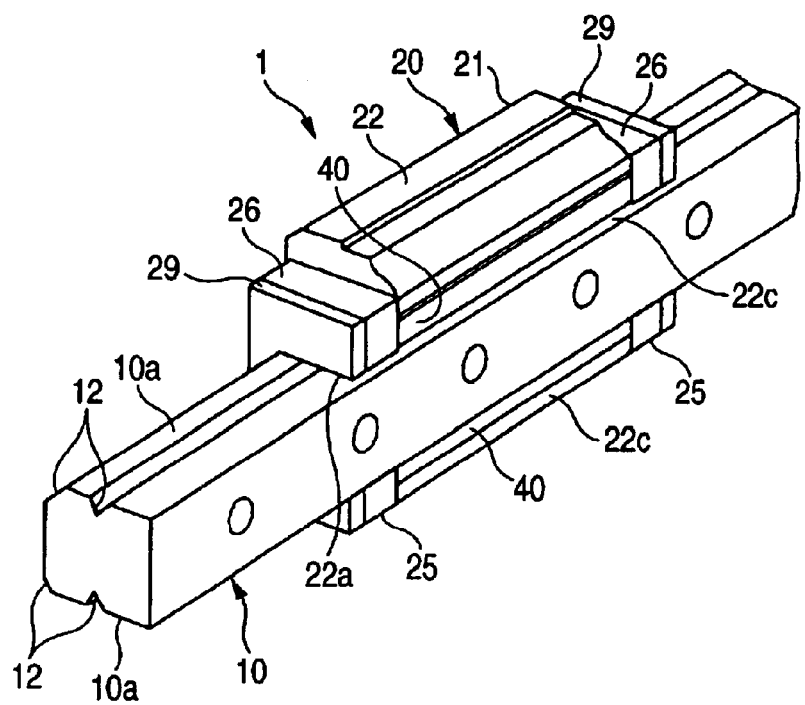
FIG. 2 is a perspective view of the linear guide bearing apparatus shown in FIG. 1, when it is viewed from another direction.

Now, description will be given below of a first embodiment of a linear guide bearing apparatus according to the invention with reference to FIGS. 1 to 4.

The present linear guide bearing apparatus 1 includes a guide rail 10, a slider 20 serving as a movable element, balls 30 serving as rolling elements, and under-seals 40.

The guide rail 10, which extends in the axial direction thereof, is made of steel having a long-and-narrow shape; and, in the width-direction two side portions thereof, for example, in the two side walls 10a thereof, there are formed first raceway grooves 12 along the axial direction thereof.

The slider 20 includes a slider main body 21 and a pair of end caps 25 respectively connected to the longitudinal-direction two end portions of the slider main body 21. The slider main body 21 and end caps 25 respectively include sleeve portions 22, 26 on the two side portions thereof, while they are respectively formed so as to have a substantially u-shaped section.

In the inner walls 22a of the two sleeve portions 22 of the slider main body 21, there are formed second raceway grooves 23 which are respectively opposed to their associated first raceway grooves 12 of the guide rail 10. Also, in the interior portions of the two sleeve portions 22, there are formed ball return grooves 24 formed of holes which penetrate through the sleeve portions 22. The pair of end caps 25 are respectively moldings formed of synthetic resin or the like and, in the end caps 25, there are respectively formed curved grooves (not shown) which are connected continuously with the longitudinal-direction two end portions of their associated second raceway grooves. Thus, the ball return grooves 24 are connected continuously with the second raceway grooves 23 through the curved grooves. In a circulation passage C which is composed of the first raceway grooves 12, second raceway grooves 23, curved grooves and ball return grooves 24, there are disposed a plurality of balls 30 which are made of steel or the like. By the way, in one of the pair of end caps 25, there is formed a grease nipple mounting hole (not shown). Also, in the drawings, reference character 29 designates a reinforcing plate.

Figure 3:
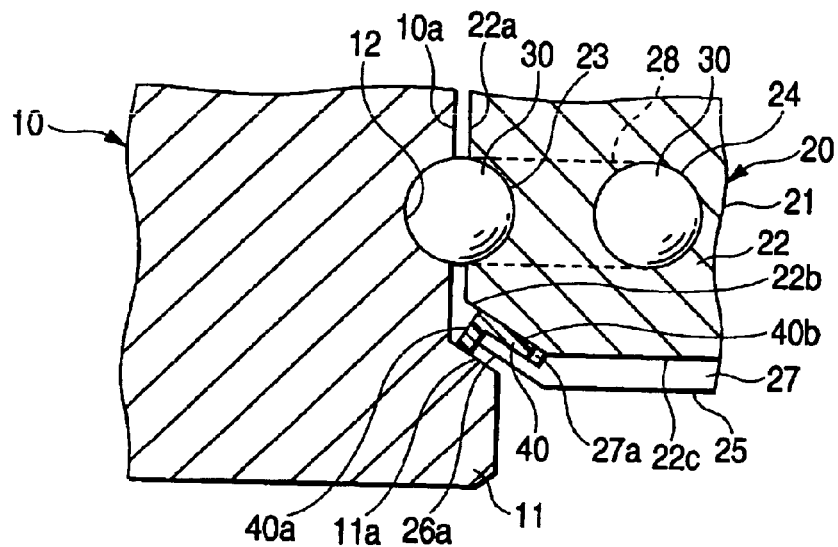
FIG. 3 is a section view of a portion of the linear guide bearing apparatus shown in FIG. 1.

The lower end portions of the inner walls 22a of the slider main body 21, as shown in FIG. 3, are formed as inclined walls 22b which respectively extend fine and long in the axial direction of the slider main body 21. Also, in the lower end portions of the end caps 25 as well, there are formed inclined walls 26a which are substantially parallel to the inclined walls 22b of the slider main body 21.

On the lower side of the sleeve portion 26 of each of the end caps 25, there is integrally disposed a projecting portion 27 which projects downwardly of the lower wall 22c of each of the sleeve portions 22 of the slider main body 21; and, in the projecting portion 27, there is formed an under-seal support groove 27a. The under-seal support groove 27a is formed in the extension of the wall surface of the inclined wall 22b and can be fitted with the support portion 40b of an under-seal 40 (which will be discussed later).

In the lower portion of the side wall 10a of the guide rail 10, there is integrally formed an inward-facing projecting portion 11. This projecting portion 11 includes an inclined surface 11a which extends fine and long in such a manner that it is opposed to and parallel to the inclined wall 22b of the slider main body 21. By the way, in FIG. 3, only one-side side wall 10a is shown; however, the other-side side wall 10a is also formed similarly.

Each under-seal 40 is disposed along the inclined wall 22b of the slider main body 21 and is used to seal a space between the side wall 10a of the guide rail 10 and the inner wall 22a of the slider main body 21 so as to prevent dust from entering between them. This under-seal 40, as shown in FIG. 3, includes a sliding contact portion 40a to be contacted with the inclined surface 11a of the side wall 10a of the guide rail 10, and a support portion 40b which can be inserted into the under-seal support groove 27a to be supported thereby; and, the under-seal 40 has a substantially corner-like section.

Figure 4:
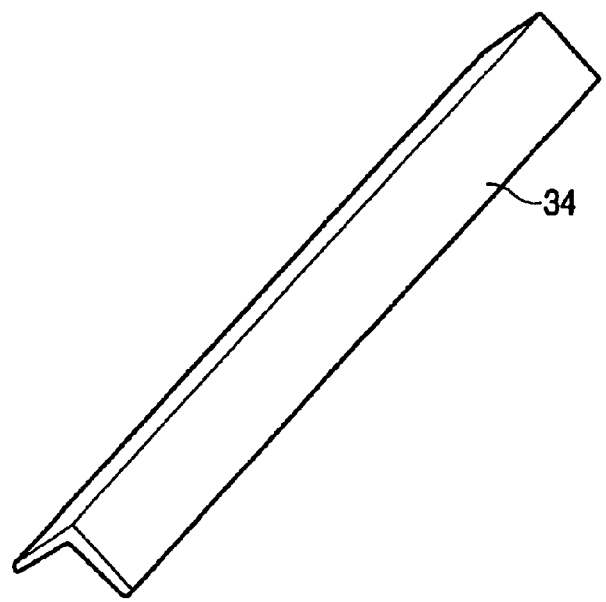
FIG. 4 is a perspective view of a blank material for an under-seal used in the linear guide bearing apparatus shown in FIG. 1.

Also, the under-seal 40, as shown in FIG. 4, is formed of a molding 34 the section shape of which is uniform in the longitudinal direction thereof; and, the molding 34 may be cut to a required length when it is used. As the molding 34, there can be used an extruded molding, a drawn molding, or an injected molding. By the way, since the under-seal 40 is supported in such a manner that the two end portions thereof are inserted into the under-seal support grooves 27a, in the present embodiment, the molding 34 is cut to a length slightly longer than the length of the slider main body 21 to thereby provide the under-seal 40. The molding 34 is formed of a single material having elasticity such as rubber or elastomer.

The present linear guide bearing apparatus 1 is assembled in the following manner. That is, while loading a plurality of balls 30 into the circulation passage C, the two end caps 25 are respectively connected to the two end portions of the slider main body 21. The two end portions of the under-seals 40 are respectively inserted into the under-seal support grooves 27a of the end caps 25. Due to this, with the two end portions thereof supported, the under-seals 40 are disposed on the lower wall 21c of the slider main body 21 in the axial direction of the slider main body 21. The thus-structured slider 20 is fitted onto the guide rail 10 from the upward direction in such a manner that the slider 20 can be moved.

In case where the slider 20 is fitted with the guide rail 10, the leading end portions of the sliding contact portions 40a of the under-seals 40 are respectively elastically contacted with the inclined walls 22b formed in the projecting portions 11 of the guide rail 10. This can seal a space between the side wall 10a of the guide rail 10 and the inner wall 22a of the slider main body 21.

In this case, the sliding contact portion 40a of the under-seal 40 is contacted with the inclined surface 11a of the guide rail 10 from the obliquely upward direction. Therefore, to the sliding contact portion 40a which extends over the entire length of the under-seal 40, there is applied an obliquely-upward-going force as a reactive action from the inclined surface 11a of the guide rail 10. This upward-going force received from the guide rail 10 can restrict the longitudinal-direction middle portion of the under-seal 40 from being flexed due to its own weight.

As described above, in the present linear guide bearing apparatus 1, the under-seal 40 includes the sliding contact portion 40a which can be elastically contacted with the guide rail 10 to receive the upward-going force from the guide rail 10. This can reduce the flexing of the under-seal 40 due to its own weight and can seal well a space between the side wall 10a of the guide rail 10 and the inner wall 22a of the slider main body 21.

Also, in the present linear guide bearing apparatus 1, since the two end portions of the under-seal 40 are formed so as to be supported by the slider 20, the number of supporting portions is small, which can facilitate the installation of the under-seal 40.

Further, because the under-seal 40 is formed of a single material, when compared with a seal material which is formed in such a manner that rubber is molded and bonded to a core bar, the under-seal 40 can be manufactured at a low cost and also it can be treated easily when it is scrapped.

Moreover, the under-seal 40 is formed of a single material obtained from a molding the section shape of which is uniform in the longitudinal direction thereof. Therefore, since a previously manufactured molding is cut to a required length as the need arises, the under-seal 40 can be manufactured at a low cost.

Now, description will be given below of a second embodiment of a linear guide bearing apparatus according to the invention with reference to FIG. 5.

Figure 5:
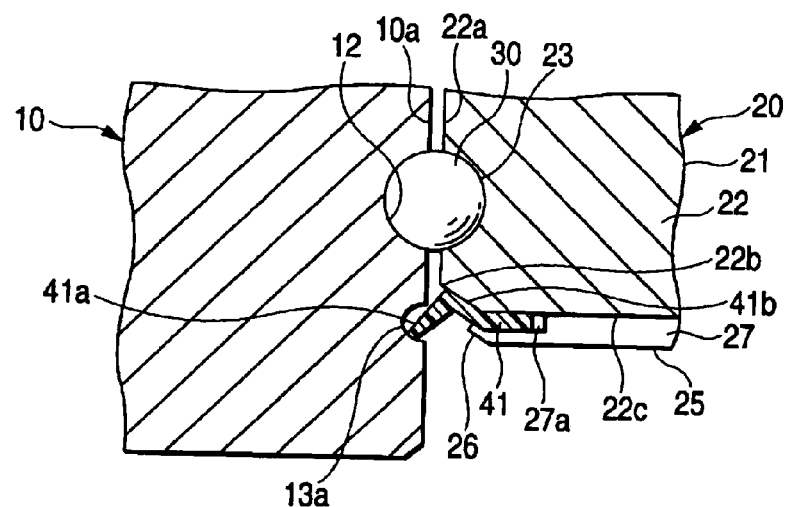
FIG. 5 is a section view of a portion of a linear guide bearing apparatus according to a second embodiment of the invention.

In the present embodiment, an under-seal 41, as shown in FIG. 5, includes a sliding contact portion 41a to be contacted with the side wall 10a of the guide rail 10, and a support portion 41b to be supported by an under-seal support groove 27a. The support portion 41b is curved from the inclined wall 22b of the slider main body 21 along the lower wall 22c, and is inserted into the under-seal support groove 27a to be supported thereby. The under-seal support groove 27a is formed to have such a shape that allows the under-seal support groove 27a to be fitted with the support portion 41b.

Also, as shown in FIG. 5, in the side wall 10a of the guide rail 10, specifically, in the portion of the side wall 10a that can be contacted with the leading end portion of the sliding contact portion 41a of the under-seal 41, there is formed a groove portion 13a the section of which has a substantially semicircular shape. This groove portion 13a may be worked simultaneously when the first raceway groove 12 is worked, or may be worked when the guide rail 10 is worked by drawing, or may be separately worked by cutting or by metal forming. By the way, in the present embodiment, although the projecting portion 11 of the guide rail 10 is omitted, the remaining portions of the present invention are the same in structure as those used in the previously described first embodiment. Therefore, the same parts are given like designations and thus the detailed description thereof is omitted here.

In the present linear guide bearing apparatus 1, the sliding contact portion 41a of the under-seal 41 is elastically contacted with the curved surface of the lower portion of the groove portion 13a formed in the side wall 10a of the guide rail 10 from the obliquely upward direction. For this reason, the sliding contact portion 41a of the under-seal 41 is given an obliquely-upward-going force from the groove portion 13a of the guide rail 10 as a reactive action. Thus, in the present embodiment as well, there can be obtained a similar effect to the first embodiment.

Also, in the present embodiment, since the sliding contact portion 41a of the under-seal 41 is formed so as to be contacted with the groove portion 13a, it is possible to omit the projecting portion 11 having the inclined surface 11a that is employed in the first embodiment. Therefore, in the present embodiment, the maximum width of the guide rail 10 can be reduced by an amount equivalent to the width of the projecting portion 11 over the maximum width of the guide rail 10 according to the first embodiment, thereby being able to reduce the manufacturing cost of the guide rail 10 accordingly.

Figure 6A:
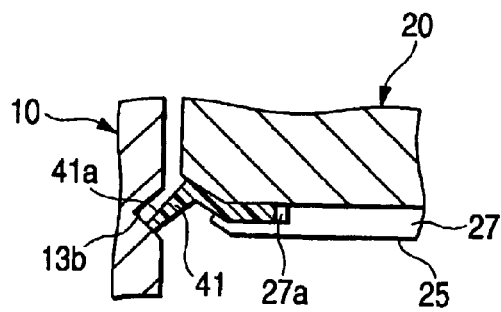
FIG. 6A is a section view of a portion of the linear guide bearing apparatus shown in FIG. 5, showing a state in which a groove portion is formed such that its section has a substantially triangular shape.
Figure 6B:
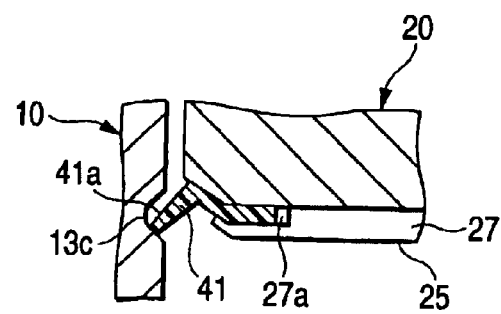
FIG. 6B is a section view of a portion of the linear guide bearing apparatus shown in FIG. 5, showing a state in which a groove portion is formed such that its section has a substantially trapezoidal shape.

By the way, in the present embodiment, the groove portion 13a, which is formed in the side wall 10a of the guide rail 10, is formed so as to have a substantially semicircular shape; however, the section shape of the groove portion 13a is not limited to a substantially semicircular shape. For example, as shown in FIGS. 6A and 6B, there can also be employed another groove portion such as a groove portion 13b having a substantially triangular shape or a groove portion 13c having a substantially trapezoidal shape, provided that the shape of the groove portion is able to apply an obliquely-upward-going force to the sliding contact portion 41a as a reactive action.

Now, description will be given below of a third embodiment of a linear guide bearing apparatus according to the invention with reference to FIG. 7.

Figure 7:
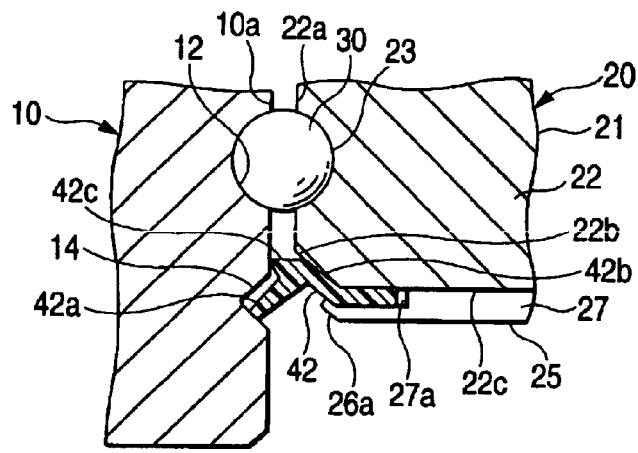
FIG. 7 is a section view of a portion of a linear guide bearing apparatus according to a third embodiment of the invention.

In the present embodiment, an under-seal 42, as shown in FIG. 7, includes a sliding contact portion 42a to be contacted with the side wall 10a of the guide rail 10, and a support portion 42b to be supported by an under-seal support groove 27a. The support portion 42b is curved from the inclined wall 22b of the slider main body 21 along the lower wall 22c, and is inserted into the under-seal support groove 27a to be supported thereby. The under-seal support groove 27a is formed to have such a shape that allows the under-seal support groove 27a to be fitted with the support portion 42b.

Also, the under-seal 42 further includes a lip 42c which extends upwardly of the sliding contact portion 42a in the same direction of the sliding contact portion 42a and also which can be slidingly contacted with the side wall 10a of the guide rail 10. By the way, in the present embodiment, the groove portion 14 is formed so as to have a substantially-triangular-shaped section; however, the section shape of the groove portion 14 may also be a substantially trapezoidal shape (see FIG. 5 and FIG. 6B). Also, although the projecting portion 11 of the guide rail 10 is omitted, the remaining portions of the present invention are the same in structure as those used in the previously described first embodiment. Therefore, the same parts are given like designations and thus the detailed description thereof is omitted here.

In the present embodiment, due to provision of the lip 42c in the under-seal 42, when compared with the first embodiment, the sealing property between the side wall 10a of the guide rail 10 and the inner wall 22a of the slider main body 21 can be enhanced further.

Now, description will be given below of a fourth embodiment of a linear guide bearing apparatus according to the invention with reference to FIG. 8.

Figure 8:
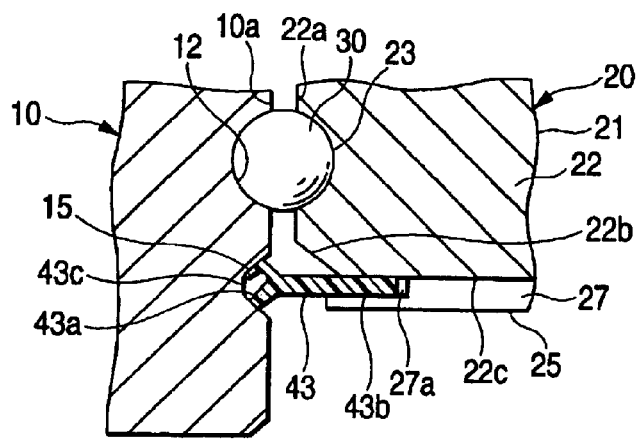
FIG. 8 is a section view of a portion of a linear guide bearing apparatus according to a fourth embodiment of the invention; and, FIG. 9 is a side view of a linear guide bearing apparatus according to a fifth embodiment of the invention.

In the present embodiment, an under-seal 43, as shown in FIG. 8, includes a sliding contact portion 43a to be contacted with the side wall 10a of the guide rail 10, and a support portion 43b to be supported by an under-seal support groove 27a. The support portion 43b is formed so as to be substantially parallel to the lower wall 22c of the slider main body 21, while the sliding contact portion 43a is inclined downwardly toward the groove portion 15 of the guide rail 10. By the way, the inclined wall 26a of the end cap 25 is omitted.

The under-seal support groove 27a is formed so as to have a shape which allows the under-seal support groove 27a to be fitted with the support portion 43b. The section of the groove portion 15 of the guide rail 10 has a substantially trapezoidal shape having two inclined surfaces respectively formed on the upper and lower sides thereof, while the leading end portion of the sliding contact portion 43a is slidingly contacted with the lower-side inclined surface of the groove portion 15.

Also, the under-seal 43 includes a lip 43c which extends upwardly of the sliding contact portion 43a in the same direction of the sliding contact portion 43a and also which can be slidingly contacted with upper-side inclined surface of the groove portion 15 of the guide rail 10. That is, the lip 43c is inclined upwardly toward the groove portion 15 side of the guide rail 10. By the way, in the present embodiment, the section shape of the groove portion 15 is formed as a substantially trapezoidal shape; however, it is also possible to employ another shape, provided it has, on the upper and lower sides thereof, two inclined surfaces which can be slidingly contacted with the lip 43c and sliding contact portion 43a. For example, the section shape of the groove portion 15 may also be a substantially semicircular shape or a substantially triangular shape (see FIG. 5 and FIG. 6A)). Also, although the projecting portion 11 of the guide rail 10 is omitted, the remaining portions of the present invention are the same in structure as those used in the previously described first embodiment. Therefore, the same parts are given like designations and thus the detailed description thereof is omitted here.

In the present embodiment, similarly to the third embodiment, due to provision of the lip 43c, the sealing property between the side wall 10a of the guide rail 10 and the inner wall 22a of the slider main body 21 can be enhanced.

By the way, in the above-mentioned third and fourth embodiments, in the under-seals 42, 43, there are disposed the lips 42c, 43c one each; however, a plurality of lips 42c, 43c may be disposed in the respective under-seals 42, 43.

Figure 9:
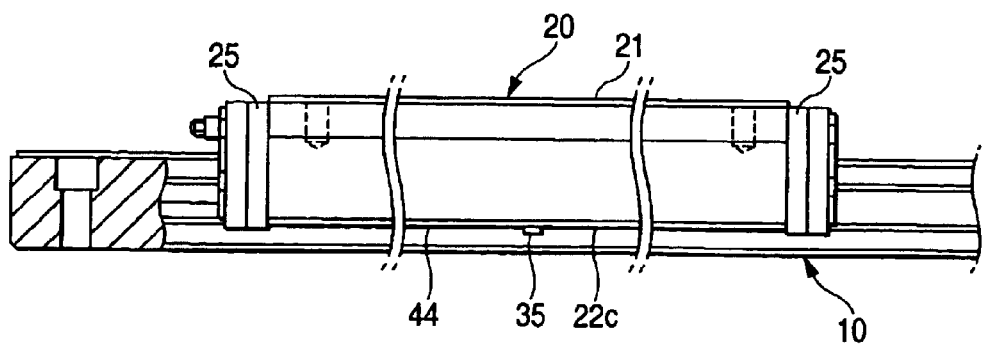

Now, description will be given below of a fifth embodiment of a linear guide bearing apparatus according to the invention with reference to FIG. 9.

In the present embodiment, in the longitudinal-direction middle portions of the under-seal 43 and the lower wall 22c of the slider main body 21, for example, in the central portions of the under-seal 43 and the lower wall 22c, there are formed rivet receive holes (not shown). And, when mounting the under-seal 43, the two end portions of the under-seal 43 are inserted into the under-seal support grooves 27a of the end caps 25 and, at the same time, the longitudinal-direction central portion thereof is fixed by a support part serving as support means such as a rivet. By the way, the support means for fixing the longitudinal-direction middle portion of the under-seal 43 is not limited to the rivet 35 but the longitudinal-direction middle portion of the under-seal 43 may also be supported on the slider using a screw or an adhesive. Also, in the present embodiment, the under-seal 43 is supported at a portion of the longitudinal-direction central portion thereof; however, the number of the supporting portions of the under-seal 43 may be one or two or more. Further, the remaining portions of the present invention are the same in structure as those used in the previously described first embodiment. Therefore, the same parts are given like designations and thus the detailed description thereof is omitted here.

In the present embodiment, since the given portions of the longitudinal-direction middle portion of the under-seal 43 are supported on the slider main body 21, even in case where the slider main body 21. That is, the under-seal 43 is long, the flexing of the under-seal 43 due to its own weight can be prevented to thereby provide a good sealing condition between the guide rail and movable body.

By the way, in the above-illustrated first to fifth embodiments, the under-seals 40–44 are respectively formed of a single material. However, as the under-seals 40–44, there may also be employed an under-seal which can be obtained by molding and bonding rubber or the like onto a core bar made of a metal plate. In this case, the strength of the under-seals 40–44 can be enhanced.

Also, in the above-illustrated first to fifth embodiments, the sliding contact surface of the guide rail 10, with which the sliding contact portions 40a–44a of the under-seals 40–44 can be elastically contacted, is not limited to the inclined surface 11a or groove portions 13a, 13b, 13c, 14, 15. Preferably, the sliding contact surface may be a surface which is inclined or curved in a direction to support the sliding contact portions 40a–44a from the lower side thereof.

Further, in the above-illustrated first to fifth embodiments, the longitudinal-direction two end portions of the sliding contact portions 40a–44a of the under-seals 40–44 are inserted into the under-seal support grooves 27a formed in the end caps 25 to thereby support them on the slider 20. However, support of the two end portions of the under-seals 40–44 is not limited to this; for example, they may also be supported on the slider 20 using a rivet, a screw, or an adhesive.

According to the linear guide bearing apparatus of the invention, the flexing of the under-seal due to its own weight can be restricted to thereby be able to enhance the sealing property between the guide rail and movable body.

What is claimed is:

1. A linear guide bearing apparatus comprising:
   a guide rail including a first raceway groove and extending in an axial direction of the linear guide bearing apparatus;
   a movable element including a second raceway groove opposed to the first raceway groove and a rolling element return groove connected continuously with the second raceway groove through curved grooves respectively formed in the two end portions of the second raceway groove, the movable element being movably fitted with the guide rail;
   a plurality of rolling elements loaded in a circulation passage including the first raceway groove, the second raceway groove, the curved grooves, and the rolling element return groove for moving the movable element along the guide rail; and,
   an under-seal disposed in the movable element for sealing a space between the guide rail and the movable element, wherein the under-seal is inserted between the movable element and a protrusion of an end cap provided on the movable element, and
   wherein the under-seal includes a sliding contact portion elastically contacted with the guide rail to thereby receive an upward-going force from the guide rail.

2. The linear guide bearing apparatus according to claim 1, wherein two end portions of the under-seal in the longitudinal-direction thereof is supported on the movable element.

3. The linear guide bearing apparatus according to claim 1, wherein at least one portion of a middle portion of the under-seal in the longitudinal-direction thereof is supported on the movable element.

4. The linear guide bearing apparatus according to claim 3, wherein the under-seal is formed of a single material.

5. The linear guide bearing apparatus according to claim 4, wherein the under-seal is formed of a single material obtained from a molding with the section shape being uniform in the longitudinal direction thereof.

6. The linear guide bearing apparatus according to claim 5, wherein the under-seal includes a lip which extends in the same direction as the sliding contact portion and is slidingly contacted with the guide rail.

7. The linear guide bearing apparatus according to claim 1, wherein the under-seal is formed of a single material.

8. The linear guide bearing apparatus according to claim 1, wherein the under-seal is formed of a single material obtained from a molding with the section shape being uniform in the longitudinal direction thereof.

9. The linear guide bearing apparatus according to claim 1, wherein the under-seal includes a lip which extends in the same direction as the sliding contact portion and is slidingly contacted with the guide rail.

10. A linear guide bearing apparatus comprising:
   a guide rail including a first raceway groove and extending in an axial direction of the linear guide bearing apparatus;
   a movable element including a second raceway groove opposed to the first raceway groove and a rolling element return groove connected continuously with the second raceway groove through curved grooves respectively formed in the two end portions of the second raceway groove, the movable element being movably fitted with the guide rail;
   a plurality of rolling elements loaded in a circulation passage including the first raceway groove, the second raceway groove, the curved grooves, and the rolling element return groove for moving the movable element along the guide rail; and,
   an under-seal disposed in the movable element for sealing a space between the guide rail and the movable element,
   wherein the under-seal includes a sliding contact portion elastically contacted with the guide rail to thereby receive an upward-going force from the guide rail,
   wherein a groove portion is formed in the guide rail, the sliding contact portion being contacted with the groove portion.

11. The linear guide bearing apparatus according to claim 10, wherein two end portions of the under-seal in the longitudinal-direction thereof is supported on the movable element.

12. The linear guide bearing apparatus according to claim 10, wherein at least one portion of a middle portion of the under-seal in the longitudinal-direction thereof is supported on the movable element.

13. The linear guide bearing apparatus according to claim 10, wherein the under-seal is formed of a single material.

14. The linear guide bearing apparatus according to claim 13, wherein the under-seal is formed of a single material obtained from a molding with the section shape being uniform in the longitudinal direction thereof.

15. The linear guide bearing apparatus according to claim 10, wherein the under-seal includes a lip which extends in the same direction as the sliding contact portion and is slidingly contacted with the guide rail.

* * * * *